United States Patent [19]

Naylor

[11] 4,338,219

[45] Jul. 6, 1982

[54] CATALYST COMPOSITIONS USED FOR COPOLYMERIZATION OF ISOMONOOLEFINS WITH CONJUGATED DIENES

[75] Inventor: Floyd E. Naylor, Bartlesville, Okla.

[73] Assignee: Phillips Petroleum Company, Bartlesville, Okla.

[21] Appl. No.: 910,040

[22] Filed: May 26, 1978

Related U.S. Application Data

[62] Division of Ser. No. 446,427, Feb. 27, 1974, Pat. No. 4,105,845.

[51] Int. Cl.$^3$ .............. C08F 4/26; C08F 4/82; C08F 4/80; C08F 36/06
[52] U.S. Cl. .............. 252/428; 252/429 R; 252/431 R; 252/431 N; 252/431 P; 252/438; 526/117
[58] Field of Search .............. 526/117, 339; 252/429 R, 428, 431 R, 431 N, 438, 431 P

[56] References Cited

U.S. PATENT DOCUMENTS

| | | | |
|---|---|---|---|
| 3,123,571 | 3/1964 | Walker et al. | 252/430 |
| 3,149,080 | 9/1964 | Gluesenkamp | 252/431 |
| 3,155,640 | 11/1964 | Etherington | 260/85.3 |
| 3,228,917 | 1/1966 | Childers | 526/339 |
| 3,231,549 | 1/1966 | Rose | 260/88.2 |
| 3,234,198 | 2/1966 | Beer, Jr. | 260/94.3 |
| 3,379,706 | 4/1968 | Wilke | 260/94.3 |
| 3,400,115 | 9/1968 | Dawans et al. | 526/117 |
| 3,409,603 | 11/1968 | Halasa et al. | 260/85.3 |
| 3,414,555 | 12/1968 | Jenkins et al. | 526/117 |
| 3,466,268 | 9/1969 | Butler et al. | 260/85.3 |
| 3,468,866 | 9/1969 | Alferov | 526/117 |
| 3,476,733 | 11/1969 | Van Den Berg | 526/117 |
| 3,483,177 | 12/1969 | Throckmorton et al. | 260/85.3 |
| 3,598,795 | 8/1971 | Van Den Berg et al. | 526/117 |
| 3,631,013 | 12/1971 | Horie et al. | 260/85.3 |
| 3,631,163 | 12/1971 | Witt | 260/85.3 |
| 3,660,369 | 5/1972 | Kormer et al. | 526/117 |
| 3,663,451 | 5/1972 | Falkirk | 260/85.3 |
| 3,736,264 | 5/1973 | Chauvin | 252/429 R |
| 3,759,889 | 9/1973 | Bauer et al. | 260/94.9 |

OTHER PUBLICATIONS

Gaylord et al., *Linear and Stereoregular Addition Polymers: Polymerization with Controlled Propagation*, Interscience Publishers, New York (1959), pp. 93 and 463.

*Primary Examiner*—P. E. Konopka

[57] ABSTRACT

The copolymerization of isoolefins with dienes is initiated by nickel source complexes with compounds of titanium or vanadium. For example, isobutylene and butadiene are copolymerized in the presence of a catalyst of bis(1,5-cyclooctadiene)nickel and titanium tetrachloride.

14 Claims, No Drawings

CATALYST COMPOSITIONS USED FOR COPOLYMERIZATION OF ISOMONOOLEFINS WITH CONJUGATED DIENES

This is a divisional application of Ser. No. 446,427, filed Feb. 27, 1974, now U.S. Pat. No. 4,105,845, patented Aug. 8, 1978.

FIELD OF THE INVENTION

The invention relates to the copolymerization of an isomonoolefin with a conjugated diene. In another aspect, the invention relates to copolymers of isomonoolefins with conjugated dienes. In a further aspect, the invention relates to a nickel source complex/-titanium or vanadium compound catalyst.

BACKGROUND OF THE INVENTION

A variety of methods are known for the polymerization of isomonoolefins. Polymerization methods also are known to polymerize conjugated dienes. However, copolymerization of isomonoolefin with a conjugated diene has presented many difficulties. The type of polymer involved, a copolymer of a monoolefin with a conjugated diene, present many tantalizing possibilities always present in a large unexplored field of new compositions of matter, and compositions prepared by new methods. The search for methods to prepare such copolymers continues.

OBJECTS OF THE INVENTION

It is an object of my invention to provide methods and initiators effective for copolymerization of isomonoolefins with conjugated dienes.

Other aspects, objects, and the several advantages of my invention will be apparent to one skilled in the art from the following disclosure and my appended claims.

SUMMARY OF THE INVENTION

It have discovered that an isomonoolefin can be effectively copolymerized with a conjugated diene by employing a nickel source complex in combination with a titanium or vanadium compound.

DETAILED DESCRIPTION OF THE INVENTION

Nickel Source Complexes

Any nickel complex which can be successfully employed in accordance with my invention is considered to be within the scope of my invention. A variety of nickel complexes can be used. Some representative and nonlimiting examples are provided below in both generic and specific terms.

Suitable nickel complexes include those which can be represented by formulas (I) and (II) below:

$$Ni(L)_n \qquad (I)$$

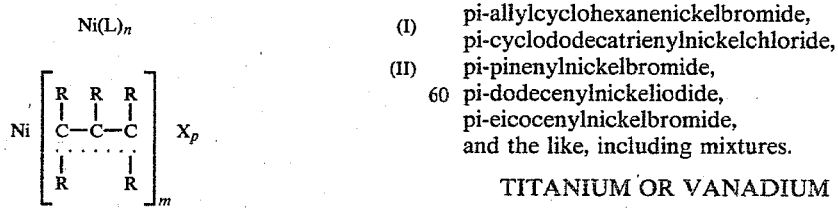

In complexes represented by Formula (I), n is an integer of 1 to 4. The ligands L can be hydrocarbyl, phosphoryl, carbonyl, nitrosyl or a mixture thereof. The hydrocarbyl ligands can be olefinic or halo-substituted olefinic containing up to approximately 16 carbon atoms per ligand molecule. The phosphoryl ligands can be alkyl or aryl phosphines, or alkyl or aryl phosphites, wherein the number of carbon atoms in each alkyl or aryl group does not exceed about 12. In one aspect at least one L is nitrosyl or halo-substituted olefinic.

Complexes described by formula (I) can be termed zero-valent nickel complexes. Nonlimiting examples of these zero-valent nickel source complexes include:

| | |
|---|---|
| Ni(CDT) | 1,5,9-cyclododecatriene nickel, |
| Ni(COD)$_2$ | biscyclooctadiene nickel, |
| Ni(CP)$_2$ | biscyclopentadiene nickel, |
| Ni(CDT)(C$_2$F$_4$) | 1,5,9-cyclododecatriene tetrafluoroethylene nickel, |
| (Ph$_3$P)$_2$Ni(CHClCCl$_2$) | bis(triphenylphosphine) trichloroethylene nickel, |
| (Bu$_3$P)$_2$Ni(C$_6$H$_5$CH=CHC$_6$H$_5$) | bis(tributylphosphine) stilbene nickel, |
| Ni[(C$_6$H$_5$O)$_3$P]$_4$ | tetrakis (triphenylphosphite) nickel, |
| Ni(CO)$_4$ | nickel tetracarbonyl, |
| Ni(NO)$_4$ | nickel tetranitrosyl, |
| Ni[(CH$_3$)$_2$PC$_{12}$H$_{25}$]$_4$ | nickel tetrakis (dimethyldodecylphosphine), | and the like, including mixtures.

In complexes represented by formula (II) m is an integer of value of 1 or 2 and p is equal to 2-m; X is halogen; and each R is individually selected from hydrogen and hydrocarbyl, and where hydrocarbyl, can be alkyl, cycloalkyl, or cycloalkenyl, or two R groups can be bound into a carbocyclic ring system containing 3 to 12 ring members. The R groups, when not involved in a ring system, can contain up to about 10 carbon atoms per R group with a total of about 20 carbon atoms per ligand radical.

The structures described by Formula (II) can be termed π-allyl nickel compounds. Such a nickel π-allyl (or pi-allyl) complex is characterized by at least one radical that contains 3 adjacent carbon atoms in allylic formation present in a system substantially planar about a central nickel atom wherein the pi electrons of the unsaturated sites have become involved in the available orbitals of the nickel atom. The three adjacent carbon atoms can, as indicated above, carry a variety of substituents. Nonlimiting examples of such pi-allyl nickel complexes include:
pi-allylnickelchloride,
bis-pi-allylnickel,
bis-pi-methallylnickel,
bis-pi-crotylnickel,
pi-allylnickelbromide,
pi-cinammylnickelchloride,
pi-allylnickeliodide,
pi-allylcyclohexanenickelbromide,
pi-cyclododecatrienylnickelchloride,
pi-pinenylnickelbromide,
pi-dodecenylnickeliodide,
pi-eicocenylnickelbromide,
and the like, including mixtures.

TITANIUM OR VANADIUM COMPOUND

A variety of titanium or, of vanadium compounds can be employed in accordance with my invention in combination with the described nickel source complexes to provide the initiator system of my invention.

Such titanium or vanadium compounds can be represented by $TiY_4$, $VY_4$, and $VOY_3$, in which Y represents chlorine, fluorine, bromine, iodine, or alkoxyl —OR' in which R' represents a hydrocarbon radical, presently for preferred operability of up to 8 carbon atoms, and which can be alkyl, cycloalkyl, aryl, or combination group thereof, or can be an acetylacetonate radical.

Examples of such compounds include vanadium acetylacetonate, titanium tetrachloride, titanium tetrabromide, titanium tetraiodide, titanium trichlorideiodide, vanadium tetrachloride, vanadium oxychloride, tetramethyl titanate, tetramethyl vanadate, tetra-sec-butyl titanate, tetra-2-ethylhexyl titanate, tetra-o-tolyl titanate, tetraphenyl titanate, tetrabenzyl titanate, tetra-2-phenylethyl titanate, tetracyclohexyl titanate, dimethyl dichloro titanate, and the like, as well as mixtures.

CATALYST SYSTEM

Molar ratios of nickel source complex to titanium or vanadium compound can vary widely, so long as the ratio is effective to copolymerize the isoolefin with the conjugated diene. Presently, I consider as exemplary a molar ratio in the range of about 0.2:1 to 10:1, with a presently preferred range of about 0.9:1 to 1.1:1 for best operability.

The process of copolymerization of isomonoolefins with conjugated dienes employs the introduction of nickel into the reaction zone in a form suitable for what is believed to be interaction with the transition metal compound to form an interaction product effective to copolymerize the diene and isomonoolefin to form copolymers thereof.

MONOMERS

The ratio of the isomonoolefin, one or more, to the conjugated diene, one or more, can range widely, depending on the copolymer desired.

As exemplary, I suggest a ratio of about 95:5 to 5:95 isomonoolefin to conjugated diene, and presently prefer a ratio of about 80:20 to 20:80.

ISOMONOOLEFINS

Isomonoolefins suitable for use can be described by the formula

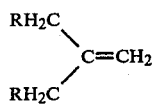

in which each R can be the same or different, and can be hydrogen, or hydrocarbyl such as alkyl, cycloalkyl, aryl, or combination thereof such as alkaryl, aralkyl, or the like, such that the total number of carbon atoms per molecule does not exceed about 20.

Examples of such isomonoolefins include 2-methylpropene (isobutylene), 2-methyl-1-butene, 2,4-dimethyl-1-pentene, 2-methyl-3-cyclohexyl-1-propene, 2-ethyl-3-phenyl-1-propene, 2-methyl-4-(4-n-propylphenyl)-1-dodecene, 1,1-di(2-phenylethyl)ethene, and the like, as well as mixtures.

CONJUGATED DIENES

Conjugated dienes employed in accordance with the process of my invention include any of those which are commonly classed as polymerizable conjugated dienes. Presently preferred for availability and reactivity are those of 4 to 12 carbon atoms per molecule, and more preferred for the same reasons are those of 4 to 8 carbon atoms per molecule, predominantly butadiene and isoprene. Examples of the conjugated dienes include, as well as the aforesaid 1,3-butadiene and isoprene, piperylene, 2-methyl-1,3-pentadiene, 2,3-dimethyl-1,3-butadiene, 1,3-octadiene, 5,6-diethyl-1,3-octadiene, and the like, alone, or in admixture.

POLYMERIZATION CONDITIONS

The polymerization reaction can be carried out under a wide range of pressure, temperature, time, and other reaction conditions known to the polymerization arts.

The process can be carried out in the presence or absence of a solvent or diluent. The use of such presently is preferred in order to promote the desired reaction and as a matter of convenience. Solvents or diluents employed preferably should be inert with respect to the catalysts and other components of the reaction mixture. Exemplary diluents include aliphatic and cycloaliphatic hydrocarbons such as n-heptane, 2,2,4-trimethylpentane, cyclohexane, and the like, as well as aromatic hydrocarbons and even halogenated aromatic hydrocarbons such as benzene, toluene, and xylenes, chlorobenzene, and the like, alone, or in admixture.

The polymerization temperatures can range fairly widely. Exemplary are temperatures in the range of about 0° to 100° C., presently preferred about 0° to 50° C. Very little polymerization reaction occurs below about 0° C.; and temperatures above about 100° C. tend to invite thermal decomposition of many of the nickel-source complexes.

The polymerization reaction can be carried out at any convenient pressure, preferably sufficient to maintain the reaction mixture substantially in the liquid phase, including autogeneous pressure if desired, or any suitable applied pressure according to the particular diluent employed and temperature in which the polymerization is carried out. Higher pressures can be employed if desired, obtained by pressurization with an inert gas such as nitrogen. Presently preferred as exemplary and convenient are pressures within a range of about 0 to 25 psig.

Polymerization time required is dependent to a large degree upon the reaction temperature employed. Reaction intervals of such as a few minutes to many hours, such as 15 minutes to 70 hours normally should be expected to be sufficient presently preferred at least about 1 hour for desired degree of polymerization. At higher polymerization temperatures, shorter times can be suitable. Extended intervals can be employed if desired or convenient.

The polymerization process of the invention should be conducted in a manner so as to avoid materials detrimental to the operation of the process, more predominantly avoiding the presence of such as carbon dioxide, molecular oxidant, water, alcohols, and the like. It is desirable to carry out the polymerization under anhydrous conditions insofar as possible, and much to be preferred is an inert atmosphere, such as polymerization under nitrogen. Continuous operation or batch operation can be employed if desired.

At the end of the desired polymerization interval, according to the temperature and degree of conversion desired, the total reaction mixture can be treated to inactivate the catalyst and to precipitate the product by any suitable means. For example, a catalyst inactivating material such as water or an alcohol can be added to the mixture to inactivate the catalyst, adding sufficient to only inactivate the catalyst, or adding in excess to further precipitate the polymer if desired. It may be advantageous to add an antioxidant, such as 2,6-di-t-butyl-4-methylphenol, to the polymer solution, and then to precipitate the polymer with an excess of a material such as methyl alcohol or isopropyl alcohol. After separation of the polymer from the solvent, by filtration, centrifugation, decantation, or the like, the polymer can be finally dried and then compounded or otherwise handled for particular use-applications.

EXAMPLES

Examples provided are designed to assist in understanding my invention. Particular materials employed, species, amounts, ratios, temperatures, should be considered as further exemplary, and not as limitative of the scope of my invention.

EXAMPLE I

A conjugated diene was copolymerized with an isomonoolefin employing a zero-valent nickel complex-transition metal salt catalyst system. The following recipe was employed:

| Recipe | Quantity |
|---|---|
| Butadiene | variable |
| Isobutylene | variable |
| Toluene | 860 phm[1] |
| Bis(1,5-cyclooctadiene)nickel | 15 mhm[2] |
| Titanium tetrachloride | 15 mhm |

[1]Parts per hundred parts monomer
[2]Gram millimoles per hundred grams monomer

In Runs 1, 3 and 4, toluene was charged to the reactor followed in order, by nitrogen purge to remove air, isobutylene and butadiene, bis(1,5-cyclooctadiene)-nickel, and titanium tetrachloride. The charge order employed in Run 2 differed somewhat in that therein the monomers were charged last, after addition of the catalyst components. Upon completion of each polymerization, 2,6-di-t-butyl-4-methylphenol was added as a 10 weight percent solution in isopropyl alcohol/toluene diluent in amount sufficient to provide 1 phm of the antioxidant. The polymer then was precipitated by the further addition of isopropyl alcohol, separated by decantation, dried, and examined for properties as shown in Table I. Results are shown in Table I below:

TABLE I

| Run No. | Butadiene[1] | Isobutylene[1] | °C. | Hrs | Conversion wt. % | I.V.[2] |
|---|---|---|---|---|---|---|
| 1 | 75 | 25 | 50 | 18 | 55 | 0.25 |
| 2 | 50 | 50 | 50 | 68 | 50 | —[3] |
| 3 | 75 | 25 | 50 | 18 | 40 | —[3] |
| 4 | 50 | 50 | 50 | 18 | 30 | —[3] |

[1]In parts by weight.
[2]Inherent viscosity determined in tetrafuran but otherwise essentially in accordance with U.S. Pat. No. 3,278,508 col. 20, note a.
[3]Not determined.

The above runs illustrate the copolymerization of a conjugated diene, butadiene, with an isomonoolefin, isobutylene, employing a nickel source complex with a titanium or vanadium compound as catalyst system. Products of the several polymerizations were gelatinous, semi-solid, sticky, and useful in compounding to make adhesives.

EXAMPLE II

A polymerization was conducted, Run 5, in accordance with the following recipe:

| Recipe | Quantity |
|---|---|
| Butadiene | 50 phm |
| Isobutylene | 50 phm |
| Toluene | 860 phm |
| Bis(1,5-cyclooctadiene)nickel | 15 mhm |
| Titanium tetrachloride | 15 mhm |
| Temperature, °C. | 50 |
| Time, hours | 68 |

Toluene was charged to the reactor followed, in order, by a nitrogen purge for removal of air, bis(1,5-cyclooctadiene)nickel, isobutylene, butadiene, and titanium tetrachloride. Polymerization conditions were maintained for approximately 68 hours. Polymer thereafter was recovered as described in Example I.

The polymer produced was redissolved in toluene, the toluene solution filtered free of gel, and the gel dried. Soluble polymer was recovered from the resulting filtrate by coagulation through the addition of isopropyl alcohol, collected by decantation, and dried. The gel fraction and soluble fraction each weighed approximately 10 g.

A two-gram portion of the soluble fraction was combined with benzoyl peroxide in the proportion of two parts per hundred parts of rubber, warmed at 100° C. overnight to induce crosslinking. The resulting product mixture then was extracted with toluene, thus removing an 0.2 gram soluble, noncrosslinked portion. The insoluble fraction produced in this crosslinking treatment was found to possess infrared absorption bands characteristic of both polyisobutylene and polybutadiene. The presence of polyisobutylene structure in the crosslinkable fraction indicates the existence of a butadiene-isobutylene copolymer produced in accordance with my invention.

Thus, this run demonstrates that the process of my invention does indeed yield a true copolymer. By subjecting the product of my inventive process to crosslinking conditions through the presence of benzoyl peroxide, butadiene-containing polymer would become gelled and thus become toluene-insoluble. Under these conditions, any polyisobutylene would remain toluene-soluble because polyisobutylene has no sites of unsaturation to permit crosslinking. A very small fraction of the crosslinked material remained toluene soluble.

EXAMPLE III

Polymerization runs were made, employing a nickel source complex with other than the titanium or vanadium salt, these other compounds known to be active as Lewis acids and which one might anticipate would also effectively assist in copolymerization. Surprisingly, such well known and active Lewis acids as aluminum bromide and alkylaluminum halides were noneffective. These polymerizations employed the following recipe:

| Recipe | Quantity |
|---|---|
| Butadiene | 50 phm |

-continued

| Recipe | |
|---|---|
| | Quantity |
| Isobutylene | 5 phm |
| Toluene | 860 phm |
| Bis(1,5-cyclooctadiene)nickel | 15 mhm |
| Titanium tetrachloride | variable |
| Aluminum bromide | variable |
| Ethylaluminum dichloride | variable |
| Temperature, °C. | 50 |
| Time, hours | 68 |
| Charge Order: | Toluene, nitrogen purge, bis(1,5-cyclooctadiene)nickel, titanium compound or Lewis acid, isobutylene, butadiene. |

Results obtained are shown in the following table:

TABLE II

| Run No. | Titanium Tetra-Chloride | Aluminum Tri-Bromide | Ethyl Aluminum Di-Chloride | Conversion % | Product Characteristic |
|---|---|---|---|---|---|
| 6 | 15 | 0 | 0 | 22 | Rubbery Solid |
| 7 | 15 | 0 | 0 | 18 | Rubbery Solid |
| 8 | 0 | 15 | 0 | 26 | Resinous, Insoluble |
| 9 | 0 | 15 | 0 | 30 | Resinous, Insoluble |
| 10 | 0 | 0 | 15 | 30 | Liquid less than 5% polyisobutylene |
| 11 | 0 | 0 | 15 | 30 | Liquid less than 5% polyisobutylene |

Parallel runs made contrasting the performance of the titanium tetrachloride with aluminum bromide and with ethylaluminum dichloride show effectiveness of my invention as compared to other materials frequently employed in catalytic combinations. Runs made with aluminum bromide did not afford a rubbery solid, but resulted in brittle solids not soluble in the polymerization mixture, and it is thought possile that these materials came from low molecular weight butadiene polymers which then cyclized and crosslinked to form the resinous material observed. Runs made with ethylaluminum dichloride generated liquids that were very fluid, and on infrared scan showed less than 5 percent polyisobutylene, and were believed to be primarily low molecular weight polybutadiene.

The products of my invention, prepared as semi-solids, could be compounded to be useful in making caulks, adhesives, and the like.

The disclosure, including data, illustrate the value and effectiveness of my invention. The examples, the knowledge and background of the field of the invention and of general principles of chemistry and other applicable sciences, have formed the bases from which the broad descriptions of the invention including the ranges of conditions and generic groups of operant components have been developed, which have formed the bases for my claims here appended.

I claim:

1. A catalyst comprising effective ratios of (A) a nickel source complex and (B) a titanium or vanadium compound,
    wherein said (A) nickel source complex is represented by Ni(L)$_n$ wherein n is an integer of 1 to 4 inclusive, L represents a ligand, and is phosphoryl, nitrosyl, or mixture, and
    wherein said (B) titanium or vanadium compound is represented by TiY$_4$, VY$_4$, or VOY$_3$, wherein Y is acetylacetonate or —OR' wherein R' is a hydrocarbyl radical of 1 to 8 carbon atoms.

2. The catalyst composition according to claim 1 wherein said L is said phosphoryl, said phosphoryl is alkyl or aryl phosphines or alkyl or aryl phosphites wherein the carbon atoms per alkyl or aryl group does not exceed 12.

3. The catalyst composition according to claim 2 wherein said Ni(L)$_n$ is bis(triphenylphosphine)trichloroethylene nickel, bis(tributylphosphine) stilbene nickel, tetrakis(triphenylphosphite) nickel, nickel tetranitrosyl, or tetrakis(dimethyldodecylphosphine) nickel.

4. The catalyst composition according to claim 1 wherein said (B) titanium or vanadium compound is vanadium acetylacetonate, tetramethyl titanate, tetramethyl vanadate, tetra-sec-butyl titanate, tetra-2-ethylhexyl titanate, tetra-o-tolyl titanate, tetraphenyl titanate, tetrabenzyl titanate, tetra-2-phenylethyl titanate, tetracyclohexyl titanate, or mixture.

5. The catalyst composition according to claim 1 employing a ratio of said (A) nickel source complex to said (B) titanium or vanadium compound in the range of about 0.2:1 to 10:1.

6. A process of preparing the catalyst composition as defined by claim 1 which comprises admixing said (A) nickel source complex with said (B) titanium or vanadium compound in a molar ratio of about 0.2:1 to 10:1 (A):(B).

7. The process according to claim 6 wherein said admixing is conducted in the presence of an aliphatic or cycloaliphatic hydrocarbon, aromatic hydrocarbon or halogenated aromatic hydrocarbon, diluent.

8. The process according to claim 7 wherein said admixing is conducted at a temperature in the range of about 0° to 100° C.

9. A catalyst comprising effective ratios of (A) a nickel source complex and (B) a titanium or vanadium compound,
    wherein said (A) nickel source complex is represented by Ni(L)$_n$ wherein n is an integer of 1 to 4, inclusive, and L represents a ligand selected from the group consisting of hydrocarbyl olefinic, halo-substituted hydrocarbyl olefinic, phosphoryl, and nitrosyl, such that at least one L is nitrosyl and
    wherein said (B) titanium or vanadium compound is represented by TiY$_4$, VY$_4$, or VOY$_3$, wherein Y is chlorine, fluorine, bromine, acetylacetonate, or —OR' in which R' is a hydrocarbyl radical of 1 to 8 carbon atoms.

10. The catalyst composition according to claim 9 wherein in said (A) Ni(L)$_n$ when a said L is hydrocarbyl olefinic or halo-substituted hydrocarbyl olefinic such L contains up to 16 carbon atoms per ligand molecule.

11. The catalyst composition according to claim 9 wherein said (A) Ni(L)$_n$ is nickel tetranitrosyl.

12. The catalyst composition according to claim 9 wherein said (B) titanium or vanadium compound is vanadium acetylacetonate, titanium tetrachloride, titanium tetrabromide, vanadium tetrachloride, vanadium oxychloride, tetramethyl titanate, tetramethyl vanadate, tetra-sec-butyl titanate, tetra-2-ethylhexyl titanate, tetra-o-tolyl titanate, tetraphenyl titanate, tetrabenzyl titanate, tetra-2-phenylethyl titanate, tetracyclohexyl titanate, or mixture.

13. The catalyst composition according to claim 9 employing a ratio of said (A) nickel source complex to said (B) titanium or vanadium compound in the range of about 0.2:1 to 10:1.

14. The catalyst composition according to claim 13 in further admixture with an aliphatic or cycloaliphatic hydrocarbon, aromatic hydrocarbon, or halogenated aromatic hydrocarbon.

* * * * *